United States Patent
Nilsson et al.

(10) Patent No.: US 10,273,850 B2
(45) Date of Patent: *Apr. 30, 2019

(54) METHOD AND SYSTEM FOR CONTROLLING NITROGEN OXIDE EMISSIONS FROM A COMBUSTION ENGINE

(71) Applicant: Scania CV AB, Södertälje (SE)

(72) Inventors: Magnus Nilsson, Årsta (SE); Henrik Birgersson, Stockholm (SE)

(73) Assignee: Scania CV AB, Södertälje (SE)

( * ) Notice: Subject to any disclaimer, the term of this patent is extended or adjusted under 35 U.S.C. 154(b) by 230 days.

This patent is subject to a terminal disclaimer.

(21) Appl. No.: 15/120,081

(22) PCT Filed: Feb. 27, 2015

(86) PCT No.: PCT/SE2015/050229
§ 371 (c)(1),
(2) Date: Aug. 18, 2016

(87) PCT Pub. No.: WO2015/130219
PCT Pub. Date: Sep. 3, 2015

(65) Prior Publication Data
US 2017/0218811 A1    Aug. 3, 2017

(30) Foreign Application Priority Data

Feb. 28, 2014  (SE) ..................... 1450229
Feb. 28, 2014  (SE) ..................... 1450230

(51) Int. Cl.
*F01N 13/00*      (2010.01)
*F01N 3/021*      (2006.01)
(Continued)

(52) U.S. Cl.
CPC ......... *F01N 3/208* (2013.01); *B01D 46/0027* (2013.01); *B01D 46/0061* (2013.01);
(Continued)

(58) Field of Classification Search
CPC ............ B01D 46/0027; B01D 46/0061; B01D 53/9418; B01D 53/9495; B01D 2279/30;
(Continued)

(56) References Cited

U.S. PATENT DOCUMENTS 5,120,695 A   6/1992  Blumrich et al.
5,239,860 A   8/1993  Harris et al.
(Continued)

FOREIGN PATENT DOCUMENTS

CN        201513221 U       6/2010
CN        CN103442805       12/2013
(Continued)

OTHER PUBLICATIONS

European Search Report for European Patent Application No. PCT/SE2015050229 dated Sep. 29, 2017.
(Continued)

*Primary Examiner* — Brandon D Lee
(74) *Attorney, Agent, or Firm* — Moore & Van Allen PLLC; W. Kevin Ransom

(57) ABSTRACT

Methods and systems are provided for treatment of an exhaust stream that comprises nitrogen oxides $NO_x$. The method comprises supplying a first additive to the exhaust stream as a first reduction of a first amount of nitrogen oxides $NO_{x\_1}$ reaching a first device, arranged to impact the first amount of nitrogen oxides $NO_{x\_1}$. The method also comprises supplying a second additive to the exhaust stream, which is used as a second reduction of a second amount of nitrogen oxides $NO_{x\_2}$ reaching a second device, arranged to reduce the second amount of nitrogen oxides
(Continued)

$NO_{x\_2}$. At least one of the first supply and the second supply is controlled, based on a total ability for the first device to provide the first reduction, and for the second device to provide the second reduction, so that a required total reduction on the nitrogen oxides $NO_x$ in the exhaust stream is provided.

20 Claims, 4 Drawing Sheets

(51) Int. Cl.
        F01N 3/20      (2006.01)
        F01N 3/035     (2006.01)
        F01N 3/10      (2006.01)
        B01D 46/00     (2006.01)
        B01D 53/94     (2006.01)
        F01N 11/00     (2006.01)
        F01N 9/00      (2006.01)
        F01N 3/023     (2006.01)
(52) U.S. Cl.
        CPC ..... *B01D 53/9418* (2013.01); *B01D 53/9495* (2013.01); *F01N 3/021* (2013.01); *F01N 3/023* (2013.01); *F01N 3/035* (2013.01); *F01N 3/103* (2013.01); *F01N 3/106* (2013.01); *F01N 3/2066* (2013.01); *F01N 9/00* (2013.01); *F01N 11/002* (2013.01); *F01N 13/009* (2014.06); *F01N 13/0093* (2014.06); *F01N 13/0097* (2014.06); *B01D 2279/30* (2013.01); *F01N 2430/00* (2013.01); *F01N 2510/06* (2013.01); *F01N 2570/14* (2013.01); *F01N 2590/08* (2013.01); *F01N 2610/02* (2013.01); *F01N 2610/144* (2013.01); *F01N 2900/04* (2013.01); *F01N 2900/14* (2013.01); *F01N 2900/1402* (2013.01); *F01N 2900/1404* (2013.01); *F01N 2900/1616* (2013.01); *Y02A 50/2344* (2018.01); *Y02T 10/24* (2013.01); *Y02T 10/47* (2013.01)
(58) Field of Classification Search
        CPC .. F01N 11/002; F01N 13/009; F01N 13/0093; F01N 13/0097; F01N 3/021; F01N 3/023; F01N 3/035; F01N 3/103; F01N 3/106; F01N 3/2066; F01N 3/208; F01N 9/00; F01N 2430/00; F01N 2510/06; F01N 2570/14; F01N 2590/08; F01N 2610/02; F01N 2610/144; F01N 2900/04; F01N 2900/14; F01N 2900/1402; F01N 2900/1404; F01N 2900/1616; Y02A 50/2344; Y02T 10/24; Y02T 10/47
        See application file for complete search history.

(56) References Cited

U.S. PATENT DOCUMENTS

| | | |
|---|---|---|
| 7,559,194 B2 | 7/2009 | Westerberg |
| 8,544,260 B2 | 10/2013 | Boorse et al. |
| 9,573,097 B2 | 2/2017 | Reichinger et al. |
| 9,670,855 B2 | 6/2017 | Dickson et al. |
| 2004/0040289 A1 | 3/2004 | Mazur et al. |
| 2004/0098979 A1 | 5/2004 | Hammerle et al. |
| 2005/0069476 A1 | 3/2005 | Blakeman et al. |
| 2005/0232830 A1 | 10/2005 | Brueck |
| 2006/0039843 A1 | 2/2006 | Patchett et al. |
| 2007/0150154 A1 | 6/2007 | Lenz |
| 2008/0008629 A1 | 1/2008 | Doring et al. |
| 2008/0060348 A1 | 3/2008 | Robel et al. |
| 2009/0035194 A1 | 2/2009 | Robel et al. |
| 2009/0035195 A1 | 2/2009 | Robel |
| 2010/0024393 A1 | 2/2010 | Chi et al. |
| 2010/0050604 A1 | 3/2010 | Hoard et al. |
| 2010/0252737 A1 | 10/2010 | Fournel et al. |
| 2010/0319320 A1 | 12/2010 | Mital et al. |
| 2011/0085954 A1 | 4/2011 | Doring et al. |
| 2011/0113759 A1 | 5/2011 | Tilinski et al. |
| 2011/0211193 A1 | 9/2011 | Saveliev et al. |
| 2011/0271664 A1 | 11/2011 | Boorse et al. |
| 2011/0295484 A1 | 12/2011 | L'Henoret |
| 2011/0313635 A1 | 12/2011 | Blanc et al. |
| 2012/0117954 A1 | 5/2012 | Yasui et al. |
| 2012/0255286 A1 | 10/2012 | Matsunaga et al. |
| 2013/0078173 A1 | 3/2013 | Cox |
| 2013/0202507 A1 | 8/2013 | Echoff et al. |
| 2013/0232953 A1 | 9/2013 | Harmsen et al. |
| 2013/0232958 A1 | 9/2013 | Ancimer et al. |
| 2013/0289857 A1 | 10/2013 | Schmitt et al. |
| 2014/0052353 A1 | 2/2014 | Sujan et al. |
| 2014/0056789 A1 | 2/2014 | Mussmann et al. |
| 2014/0065044 A1 | 3/2014 | Ito et al. |
| 2014/0229010 A1 | 8/2014 | Farquharson et al. |
| 2015/0052878 A1 | 2/2015 | Qi |
| 2015/0131093 A1 | 5/2015 | Saptari |
| 2015/0337702 A1 | 11/2015 | Ettireddy et al. |
| 2016/0166990 A1 | 6/2016 | Phillips et al. |

FOREIGN PATENT DOCUMENTS

| | | |
|---|---|---|
| DE | 3733501 A1 | 4/1989 |
| DE | 102006031650 A1 | 1/2008 |
| DE | 102008026191 A1 | 1/2009 |
| DE | 102009038835 A1 | 3/2011 |
| DE | 102010050312 A1 | 5/2012 |
| DE | 102012201809 A1 | 9/2012 |
| DE | 202013101028 U1 | 5/2013 |
| DE | 102015015260 A1 | 6/2017 |
| EP | 1181531 A1 | 2/2002 |
| EP | 2390480 A1 | 11/2011 |
| KR | 20140143145 A1 | 12/2014 |
| RU | 2354833 C2 | 6/2010 |
| RU | 2504668 C2 | 2/2017 |
| WO | 2007104382 A1 | 9/2007 |
| WO | 2009017639 A1 | 2/2009 |
| WO | 2012037342 A1 | 3/2012 |
| WO | 2013022516 A1 | 2/2013 |
| WO | 2013095214 A1 | 6/2013 |
| WO | 2013100846 A1 | 7/2013 |
| WO | 2014016616 A1 | 1/2014 |
| WO | 2014149297 A1 | 9/2014 |

OTHER PUBLICATIONS

Korean Office Action for Korean Patent Application No. 10-2016-7026599 dated Apr. 23, 2018.
International Search Report and Written Opinion of the International Searching Authority for PCT/SE2015/050229 dated Jun. 12, 2015.
International Preliminary Report on Patentability of PCT/SE2015/050229 dated May 19, 2016.
NOx Controls; EPA/452/B-02-001 Section 4—Retrieved online on Jun. 5, 2015 from http://www.epa.gov/ttncatc1/dir1/cs4-2ch2.pdf; pp. 2-6, third paragraph.
Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.
Russian Office Action for Russian Application No. 2016134217 dated Apr. 4, 2018.

METHOD AND SYSTEM FOR CONTROLLING NITROGEN OXIDE EMISSIONS FROM A COMBUSTION ENGINE

CROSS-REFERENCE TO RELATED APPLICATIONS

This application is a national stage application (filed under 35 § U.S.C. 371) of PCT/SE15/050229, filed Feb. 27, 2015 of the same title, which, in turn, claims priority to Swedish Application Nos. SE1450229-8 and SE1450230-6, both filed Feb. 28, 2014 of the same title; the contents of each of which are hereby incorporated by reference.

FIELD OF THE INVENTION

The present invention relates to a method, system and computer program product, which results from a combustion in a combustion engine and comprises nitrogen oxides.

BACKGROUND

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in, for example, vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor. This is described in more detail below.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may also comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

BRIEF DESCRIPTION OF THE INVENTION

To some extent, the performance of the exhaust treatment system may be enhanced by increasing the substrate volumes comprised in the exhaust treatment system, which in particular reduces losses due to uneven distribution of the exhaust flow through the substrate. At the same time, a larger substrate volume provides a greater back pressure, which may counteract gains in fuel efficiency due to the higher conversion degree. Larger substrate volumes also entail an increased cost. It is thus important to be able to use the exhaust treatment system optimally, for example by avoiding over-sizing and/or by limiting the exhaust treatment system's spread in terms of size and/or manufacturing cost.

The function and efficiency for catalysts in general, and for reduction catalysts specifically, is for example strongly dependent on the temperature over the reduction catalyst. The term "temperature over the reduction catalyst" as used herein, means the temperature in/at/for the exhaust stream through the reduction catalyst. The substrate will assume this temperature due to its heat exchanging ability. At a low temperature over the reduction catalyst, the reduction of nitrogen oxides $NO_x$ is typically ineffective. The $NO_2/NO_x$-fraction in the exhausts provides a certain potential for increasing the catalytic activity, also at lower exhaust temperatures. The temperature over the reduction catalyst and the $NO_2/NO_x$-fraction are, however, generally difficult to control, since they to a great extent depend on a number of factors, such as how the driver drives the vehicle. For example, the temperature over the reduction catalyst depends on the torque requested by a driver and/or by a cruise control, on the appearance of the road section in which the vehicle is located, and/or the driving style of the driver.

Prior art exhaust treatment systems, such as systems that many manufacturers have used to meet the Euro VI emission standard, often comprise a first oxidation catalyst, a diesel particulate filter and a reduction catalyst. These prior art systems have problems related to the large thermal mass/inertia of the catalysts/filter and the large thermal mass/inertia of the rest of the exhaust treatment system, comprising for example exhaust pipes, silencers and various connections. At for example cold starts, where both the engine and the exhaust treatment system are cold, and at throttle from low exhaust temperatures, where more torque than previously is requested, for example when easy city driving turns into highway driving, or after idling and power take-off, it is primarily the diesel particulate filter's large thermal mass/inertia that causes the temperature of the reduction catalyst to increase only slowly in such prior art exhaust treatment systems. Thus, at for example cold starts and at vehicle operation with temperature- and/or flow transient elements, the function of the reduction catalyst deteriorates, and accordingly the reduction of nitrogen oxides $NO_x$ also deteriorates. This deterioration may result in a poor exhaust purification, risking unnecessary pollution of the environment. Additionally, because of the deterioration of the reduction catalyst's function, the risk of not achieving the regulatory requirements relating to exhaust purification increases. Fuel consumption may also be adversely impacted by the deteriorating function, since fuel energy may then need to be used to increase the temperature and efficiency of the reduction catalyst, via different temperature increasing measures.

There is accordingly a need for an optimization of the function in today's exhaust treatment systems.

Therefore, one objective of the present invention is to provide a method and a system which may provide a high performance, and a good function, under varying conditions.

This objective is achieved through the method, apparatus, and computer program product described herein.

According to the present invention a method and an exhaust treatment system are provided for treatment of an exhaust stream, which results from a combustion in a combustion engine and comprises nitrogen oxides $NO_x$.

A first supply of a first additive into the exhaust stream is carried out through the use of a first dosage device, arranged in the exhaust treatment system.

The first additive is used for a first impact on a first amount of nitrogen oxides $NO_{x\_1}$, which reaches a first device arranged downstream of the first dosage device, in order to impact the first amount of nitrogen oxides $NO_{x\_1}$.

A second supply of a second additive into the exhaust stream is carried out through the use of a second dosage device, arranged downstream of the first device.

The first and/or second additive are used for a second impact on a second amount of nitrogen oxides $NO_{x\_2}$, reaching a second device, arranged downstream of the second dosage device, in order to impact the second amount of nitrogen oxides $NO_{x\_2}$.

According to the present invention, at least one of the first supply and the second supply is controlled based on a total ability for the first device to provide the first impact, and for the second device to provide the second impact, so that a required total impact on the nitrogen oxides $NO_x$ in the exhaust stream is provided by the exhaust treatment system.

Through the use of the present invention, a first and a second device are thus used, which impact, for example by way of reduction, the amount of nitrogen oxides $NO_x$ in the exhaust stream. In addition, the supply of additive is controlled, which also controls the impact on nitrogen oxides $NO_x$ regarding the first and second device, respectively, based on a total impact on nitrogen oxides $NO_x$ in the system, which means that a cooperation/symbiosis between the impact provided by the first and second device may be optimized.

The first impact on nitrogen oxides $NO_x$ in the first device may here thus be controlled in such a way that the activity of the first device constitutes a complement to the function of the second device. Similarly, the second impact on nitrogen oxides $NO_x$ of the second device may be controlled in such a way that the activity of the second device constitutes a complement to the function of the first device.

These possibilities of optimizing the first device, and/or the second device, result in an overall efficient exhaust purification, which better reflects the conditions and/or characteristics of the complete exhaust treatment system.

This means that the present invention may provide the required impact, such as for example the required reduction, of nitrogen oxides $NO_x$ in the exhaust stream under a large number of different conditions. Accordingly, legal requirements and/or standards for emissions of nitrogen oxides $NO_x$ from the exhaust treatment system may be fulfilled in many more conditions and/or driving modes, than when prior art systems are used.

If, for example, a particulate filter is arranged between the first and second device, this means that the first and second device are exposed to different temperature functions/temperature processes, since the particulate filter has a significant thermal inertia/mass. The present invention may optimize the function for both the first and the second device, by taking into account the respective device's ability to impact nitrogen oxides $NO_x$ in the exhaust stream, so that an overall required ability is provided.

Through the use of the present invention a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained, when the present invention is used.

Through the use of the present invention, the fraction of nitrogen oxides $NO_x$ consisting of nitrogen dioxide $NO_2$ may be actively controlled, which is facilitated by an active control of the amount of nitrogen oxides $NO_x$ upstream of at least one substrate with oxidizing coating, for example comprising precious metals, in the exhaust treatment system. This control of the ratio $NO_2/NO_x$ may, apart from advantages in catalytic performance, such as higher $NO_x$-conversion, also provide for a possibility of reducing emissions, specifically of nitrogen dioxide $NO_2$, which result in a very poisonous and strong smelling emission. This may result in advantages at a potential future introduction of a separate legal requirement relating to nitrogen dioxide $NO_2$, through a possibility of reducing emissions of nitrogen dioxide $NO_2$. This may be compared with for example the Euro VI-system, in which the fraction of nitrogen dioxide $NO_2$ provided at exhaust purification may not be directly impacted in the exhaust treatment system itself, since the fraction of nitrogen dioxide $NO_2$ in the Euro VI-system is due to usage/operation, and may not be controlled in any other way.

The present invention also has an advantage in that two cooperating dosage devices are used in combination for the dosage of a reductant, for example urea, upstream of the first and second devices, which relieves and facilitates mixture and potential vaporization of the reductant, since the injection of the reductant is divided between two physically separate positions. This reduces the risk of the reductant cooling down the exhaust treatment system locally, which may potentially form deposits at the positions where the reductant is injected, or downstream of such positions.

BRIEF LIST OF FIGURES

The invention will be illustrated in more detail below, along with the enclosed drawings, where similar references are used for similar parts, and where:

DESCRIPTION OF PREFERRED EMBODIMENTS

Figure 1:
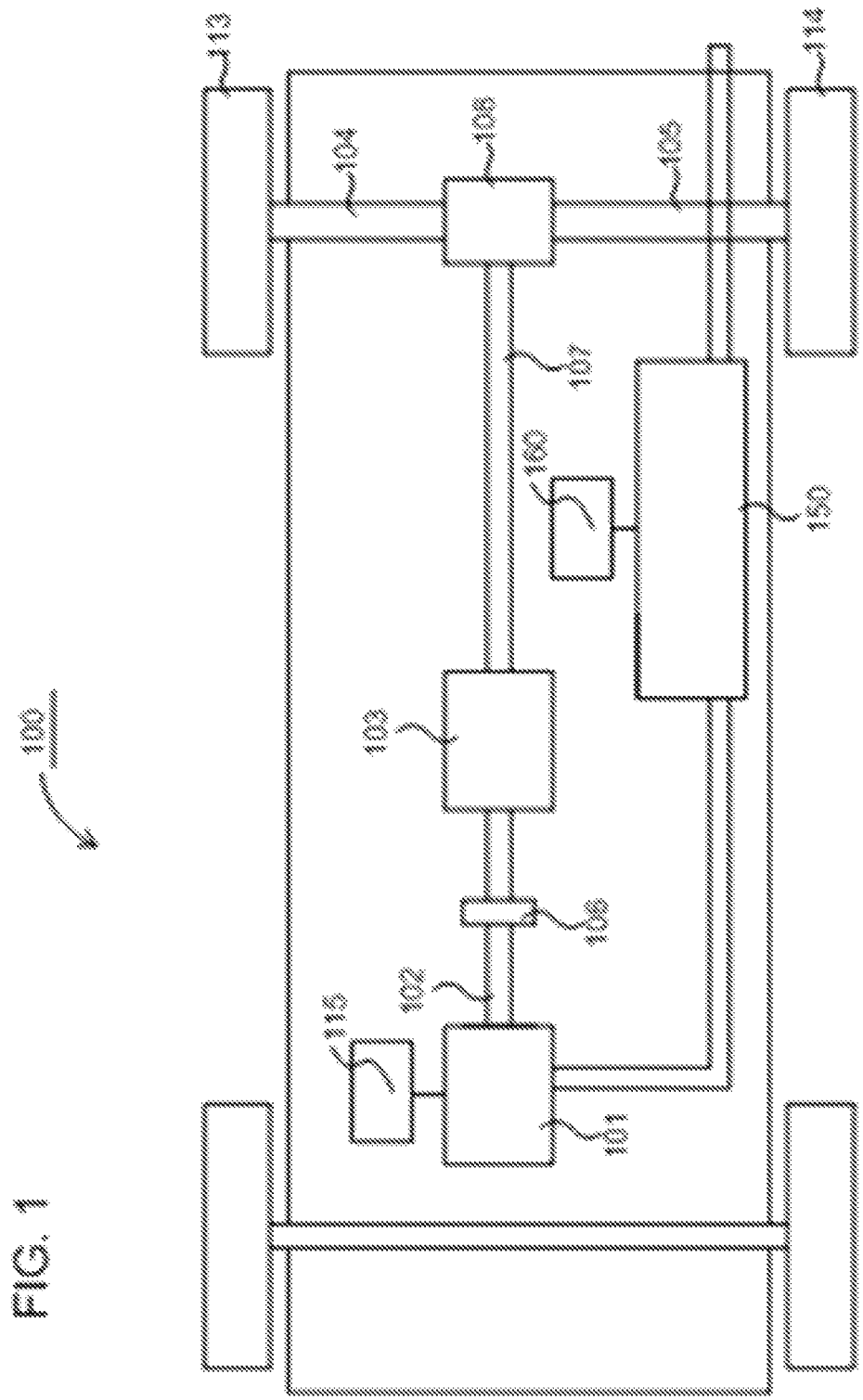
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the engine's control system via a control device 115. Likewise, the clutch 106 and the gearbox 103 may be controlled by the vehicle's control system, with the help of one or more applicable control devices (not shown). Naturally, the vehicle's power-train may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to the said final drive 108.

The vehicle 100 also comprises an exhaust treatment system/exhaust purification system 150 for treatment/purification of exhaust emissions resulting from combustion in the combustion chamber of the combustion engine 101, which may consist of cylinders. The exhaust treatment system 150 may be controlled by the vehicle's control system via a control device 160.

Figure 2:
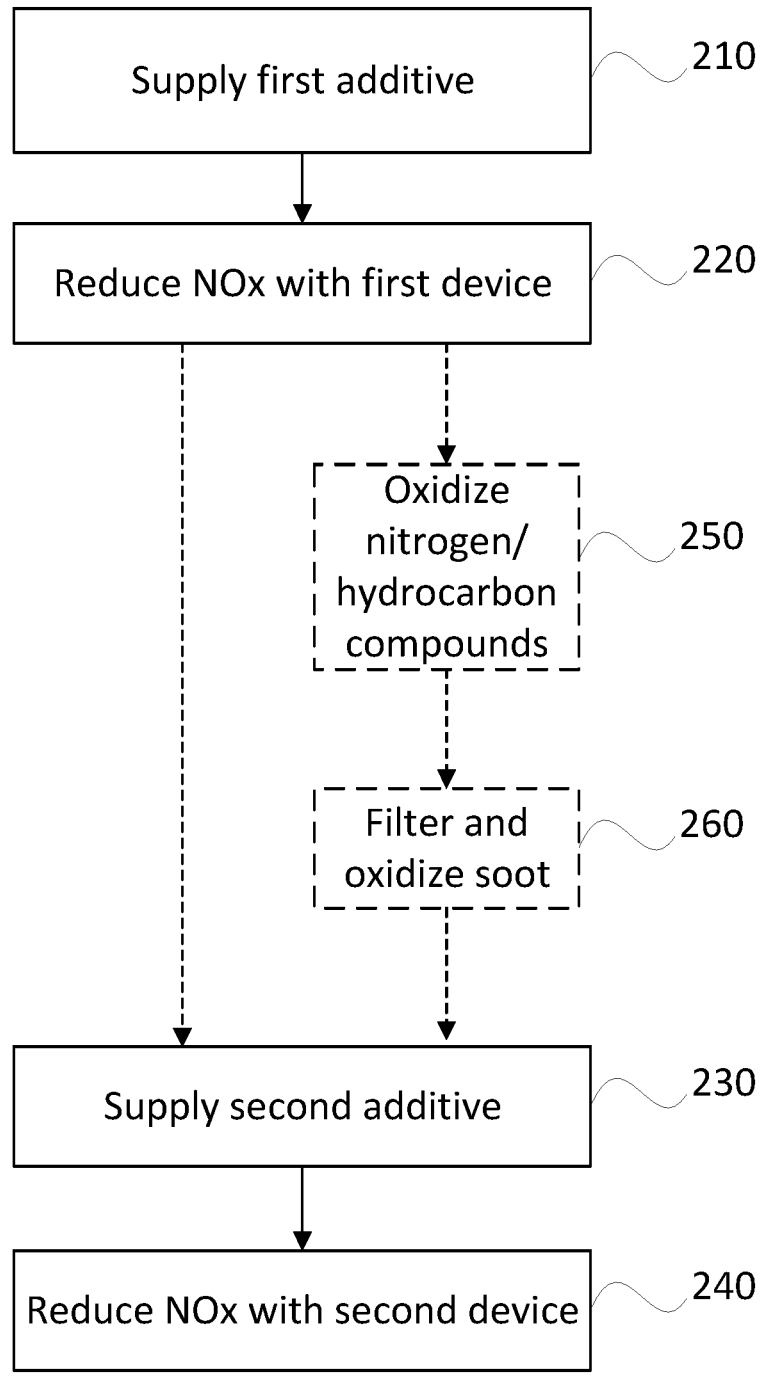
FIG. 2 shows a flow chart for the method for exhaust treatment according to the invention.

According to the present invention, a method is provided for the treatment of an exhaust stream, which results from a combustion in a combustion engine and comprises nitrogen oxides $NO_x$. This method may be illustrated with the flow chart in FIG. 2.

In a first step 210 of the method, a first supply of a first additive into the exhaust stream is implemented, through the use of a first dosage device arranged in the exhaust treatment system. This first supply may, according to the present invention, be controlled based on an overall ability for a first device, described below, to provide the first impact, and for a second device, described below, to provide the second impact, so that a required total impact on the nitrogen oxides $NO_x$ in the exhaust stream is provided by the exhaust treatment system.

In a second step of the method 220, the first additive is used for a first impact on a first amount of nitrogen oxides $NO_{x\_1}$, reaching a first device arranged downstream of the first dosage device, to impact the first amount of nitrogen oxides $NO_{x\_1}$. Here, the impact on the first amount of nitrogen oxides $NO_{x\_1}$ thus takes place in the first device.

In a third step 230 of the method, a second supply of a second additive into the exhaust stream is implemented, through the use of a second dosage device, arranged downstream of the first device. The second supply may, according to the present invention, be controlled based on an overall ability for the first device to provide the first impact, and for the second device, described below, to provide the second impact, so that a required total impact of nitrogen oxides $NO_x$ in the exhaust stream is provided by the exhaust treatment system.

In a fourth step 240 of the method, the first and/or second additive is used for a second impact on a second amount of nitrogen oxides $NO_{x\_2}$, reaching a second device, arranged downstream of the second dosage device, to impact the second amount of nitrogen oxides $NO_{x\_2}$. Here, the impact of the first amount of nitrogen oxides $NO_{x\_1}$ thus takes place in the second device.

Thus, according to the present invention, at least one of the first supply and the second supply is controlled, and therefore also at least one of the corresponding first impact 220 and second impact 240 on the nitrogen oxides $NO_x$, based on an overall ability for the first device to provide the first impact 220, and for the second device to provide the second impact 240, so that a required total impact on the nitrogen oxides $NO_x$ in the exhaust stream is provided by the exhaust treatment system.

Through the use of the present invention, a cooperation/symbiosis between the impact provided by the first and second device may be used, in order to provide an optimized exhaust treatment with respect to nitrogen oxides $NO_x$.

The first 220 and second 240, respectively, impact on nitrogen oxides $NO_x$ may here thus be controlled, so that the activity of the first device constitutes a complement to the function of the second device, and/or so that the activity of the second device constitutes a complement to the function of the first device. These possibilities of optimizing the first device, and/or the second device, result in an overall efficient exhaust purification, which better reflects the conditions and/or characteristics of the complete exhaust treatment system.

According to one embodiment, an oxidation catalyst DOC and a particulate filter DPF, following downstream, are arranged between the first device and the second dosage device, in order to oxidize nitrogen and/or hydrocarbon compounds 250, and to filter and oxidize soot 260, respectively. According to one embodiment, both the oxidation of nitrogen and/or hydrocarbon compounds 250, and the filtering and oxidation of soot 260, may be carried out by an at least partly coated particulate filter cDPF.

If a particulate filter is arranged between the first and second device, this means that the first and second device are exposed to different temperature functions/temperature processes, since the particulate filter has a significant thermal inertia/mass. The present invention may optimize the function for both the first and the second device, by taking into account the respective device's ability to impact nitrogen oxides $NO_x$ in the exhaust stream, so that an overall required ability is provided.

The required total impact on nitrogen oxides $NO_x$ in the exhaust stream, which the present invention ensures will be obtained, may be determined based on currently measured, modelled and/or predicted operating conditions for the combustion engine, and/or based on at least one threshold value for emission of nitrogen oxides $NO_x$. This threshold value may consist of, or correspond to, a threshold value corresponding to a legal requirement for emission of nitrogen oxides $NO_x$, a threshold value determined by authorities, representing a permitted emission of nitrogen oxides $NO_x$, and/or a threshold value or a standard, corresponding to a maximum desired emission of nitrogen oxides $NO_x$.

Thus, the present invention may ensure that legal requirements or similar for emissions are fulfilled under a large number of different operating conditions.

According to one embodiment of the present invention, the control of the first supply 210 of the first additive is carried out in such a way that a reduction of the first supply 210 of the first additive is provided.

This reduction of the first supply 210 may, according to one embodiment, correspond to an interruption of the first supply 210 of the first additive. Such an interruption is, according to the embodiment, acceptable if the second device, through its second impact 240, may itself provide a required total impact on the nitrogen oxides $NO_x$ in the exhaust stream. In other words, the first supply 210 may be controlled to be interrupted, if it may be concluded that the second impact 240 is sufficient to cope with, for example, legal requirements applicable to emissions of nitrogen oxides $NO_x$.

Such an interruption of the first supply 210 of the first additive means that the first impact 220 on the first amount of nitrogen oxides $NO_{x\_1}$ decreases considerably, so that the first amount of nitrogen oxides $NO_{x\_1}$ may, relatively unaffected, pass through the first device and reach the subsequent components in the exhaust treatment system, for example a subsequent particulate filter DPF, which may for example be an at least partly coated particulate filter cDPF. The particulate filter DPF/cDPF may use this greater availability of nitrogen oxides $NO_{x\_1}$ to increase the efficiency of soot oxidation in the filter.

According to one embodiment of the present invention, the first device may be regenerated during and/or after the reduction of the first supply 210, where the reduction may for example constitute an interruption, such as the one described above. During the regeneration residues of the first additive, which have accumulated in the first device, may be eliminated.

According to one embodiment, the reduction and/or interruption of the first supply 210 of the additive may continue for a period $T_{stop\_1}$, which has a length corresponding to the time it takes to eliminate the residues of the first additive in the first device, and/or the time during which the second device may be able to provide a required impact on nitrogen oxides $NO_x$.

The first device's ability to provide the first impact 220 may be contingent on a number of parameters. The catalytic characteristics of the first device constitute such a parameter, and may for example be contingent on the catalyst type of the first device, a temperature interval within which the first device is active, a coverage degree of additive for the first device, and/or a temperature at the first device.

According to one embodiment of the present invention, the control of the second supply 230 of the second additive provides for a reduction of the second supply 230 of the second additive.

The reduction of the second supply 230 may, according to one embodiment, correspond to an interruption of the second supply 230. A control which results in such an interruption of the second supply 230 is, according to the embodiment, acceptable if the first device may, alone, provide a required total impact on the nitrogen oxides $NO_x$ in the exhaust stream through the first impact 220.

The second device may be regenerated during and/or after the reduction, and/or the interruption of the second supply 230 of the second additive, so that residues of the second additive, which have remained accumulated in the second device 332, may be eliminated.

According to one embodiment, the reduction and/or interruption of the second supply 230 of the additive may continue for a period $T_{stop\_2}$ which has a length corresponding to the time it takes to eliminate the residues of the second additive in the second device, and/or the time during which the first device may, alone, provide a required impact on nitrogen oxides $NO_x$.

The ability of the second device to provide the second impact 240 may be contingent on a number of parameters related to the catalytic characteristics for the second device, which may for example comprise a catalyst type for the second device, a temperature interval within which the second device is active, a coverage degree of additive for the second device, and/or a temperature at the second device.

According to one embodiment, the control of the first supply 210 of the first additive, and/or the control of the second supply 230 of the second additive, results in a respective increase of the first supply 210, and/or of the second supply 230.

According to one embodiment of the present invention, the first impact 220 on the first amount of nitrogen oxides $NO_{x\_1}$ comprises a first reduction of the first amount of nitrogen oxides $NO_{x\_1}$, through a first selective catalytic reduction catalyst $SCR_1$, followed by a reduction of nitrogen oxides $NO_x$, and/or oxidation of potential additive in the exhaust stream, through a first slip-catalyst $SC_1$. Here, a first selective catalytic reduction catalyst $SCR_1$ is thus arranged downstream of the first dosage device, and a slip-catalyst $SC_1$ is arranged downstream of the first selective catalytic reduction catalyst $SCR_1$.

The control of the first supply 210 may then be carried out in such a way that the first supply 210 of the first additive is increased, until a slip of additive out from the first selective catalytic reduction catalyst $SCR_1$ arises. The slip of additive may here be due to the filling/coverage degree for the additive in the first selective catalytic reduction catalyst $SCR_1$, which is obtained at the increase of the first supply 210, exceeding the value for the maximum filling degree of additive in the first selective catalytic reduction catalyst $SCR_1$. In other words, the first selective catalytic reduction catalyst $SCR_1$ is here filled up to a maximum with additive, which results in a very efficient reduction of nitrogen oxides $NO_x$ in the first device.

The increase of the first supply 210 of the first additive may here be carried out in such a way that the slip of additive passing out from the first selective catalytic reduction catalyst $SCR_1$, and reaching the first slip-catalyst $SC_1$, may substantially be stored and/or oxidized in the first slip-catalyst $SC_1$. Thus, substantially no additive is allowed to follow the exhaust stream to, and negatively impact the function of, components placed downstream, such as for example an oxidation catalyst DOC, and/or a particulate filter DPF/cDPF.

The first amount of nitrogen oxides $NO_{x\_1}$ may, according to one embodiment, be represented by a first ratio $NO_{2\_1}/NO_{x\_1}$, between a first amount of nitrogen dioxide $NO_{2\_1}$ and a first amount of nitrogen oxides $NO_{x\_1}$ reaching the first device. A value $(NO_{2\_1}/NO_{x\_1})_{det}$ may be determined for this first ratio $NO_{2\_1}/NO_{x\_1}$, for example as a measured, modelled and/or predicted value. For this embodiment, at least one oxidizing component, such as for example an oxidation catalyst DOC, may be arranged upstream of the first device.

The first supply 210 of the first additive may, according to one embodiment, be based on this determined value $(NO_{2\_1}/NO_{x\_1})_{det}$, and accordingly be controlled in such a way that a fast reduction, also called "fast SCR", may be used in the first device. Thus, the first supply 210 may be controlled in such a way that the reduction in the first device occurs, to as great an extent as possible, via reaction paths over both nitrogen oxides NO, and nitrogen dioxide $NO_2$. Accordingly, the volume requirements relating to the catalyst may also be reduced. In fast reduction, the reaction uses equal parts of nitrogen monoxide NO and nitrogen dioxide $NO_2$, which means that an optimal value for the molar ratio $NO_2/NO_x$ is nearly 50%.

A corresponding ratio $NO_{2\_2}/NO_{x\_2}$ between a second amount of nitrogen dioxide $NO_{2\_2}$ and a second amount of nitrogen oxides $NO_{x\_2}$ reaching the second device may be determined, and used to control the second supply 230 of the second additive. Thus, the second supply 230 is then controlled, based on a determined value $(NO_{2\_2}/NO_{x\_2})_{det}$ for the second ratio, in such a way that fast reduction may be used in the second device. For this embodiment, at least one oxidizing component, such as for example an oxidation catalyst DOC, may be arranged upstream of the second device.

A person skilled in the art will realize that a method for treatment of an exhaust stream according to the present invention may also be implemented in a computer program, which when executed in a computer will cause the computer to execute the method. The computer program usually consists of a part of a computer program product 403, where the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
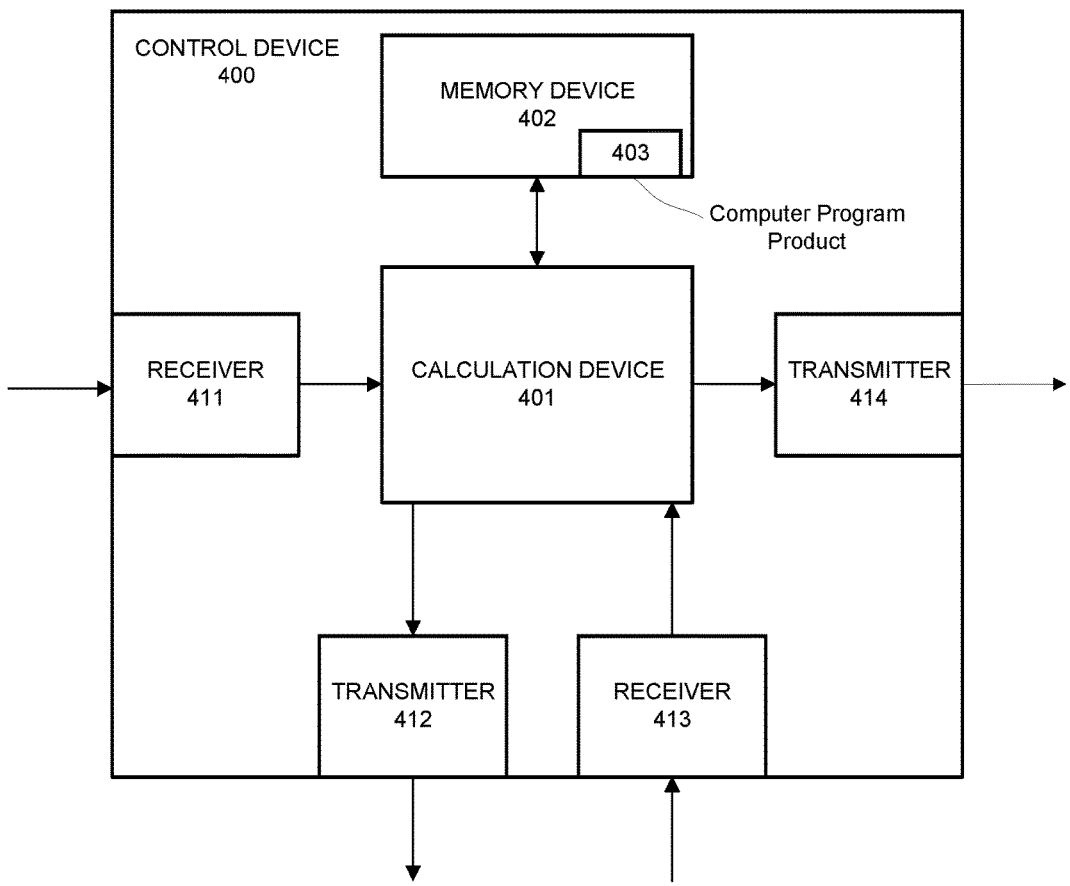
FIG. 4 shows a control device, in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code, and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals. These input and output signals may contain wave shapes, pulses or other attributes, which may be detected as information by the devices 411, 413 for the receipt of input signals, and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment shown, is implemented in the control device 400. The invention may, however, also be implemented wholly or partly in one or several other control devices already existing in the vehicle, or in a control device dedicated to the present invention.

Here, and in this document, devices are often described as being arranged to carry out steps in the method according to the invention. This also comprises that the devices are adapted and/or set up to carry out these method steps.

Figure 3:
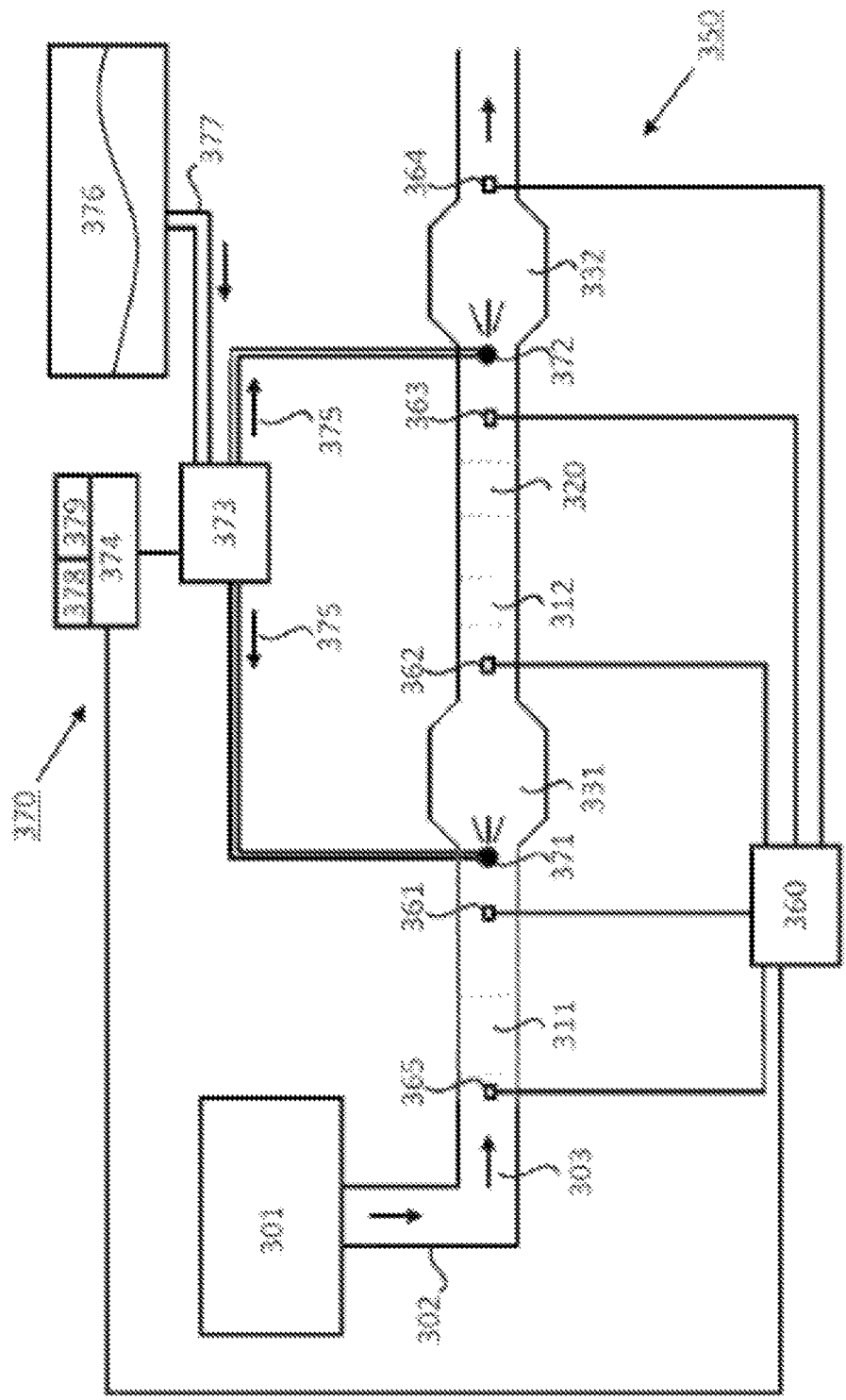
FIG. 3 shows an example of an exhaust treatment system according to the present invention.

FIG. 3 schematically shows an exhaust treatment system 350, which is connected via an exhaust pipe 302 to a combustion engine 301. Exhausts generated at combustion in the engine 301, that is to say the exhaust stream 303 (indicated with arrows), are led past a first dosage device 371, arranged in the exhaust treatment system 350 to provide a first supply 210 of a first additive into the exhaust stream 303.

The exhaust treatment system 350 comprises a first device 331, arranged downstream of the first dosage device 371, and arranged to provide a first impact 220 on a first amount of nitrogen oxides $NO_{x\_1}$ reaching the first device 331. At this first impact, which occurs in the first device 331, the first additive is used, which was supplied to the exhaust stream 303 during the first supply 210.

The exhaust treatment system 350 also comprises a second dosage device 372, arranged downstream of the first device 331, to provide a second supply 230 of a second additive to the exhaust stream 303.

Downstream of the second dosage device 372, a second device 332 is arranged, to provide a second impact 240 on a second amount of nitrogen oxides $NO_{x\_2}$ reaching the second device 332. At this second impact 240 the second additive is used, which was supplied to the exhaust stream by the second dosage device 372.

The exhaust treatment system 350 also comprises at least one dosage control device 374, arranged to control at least one of the first supply 210 and the second supply 230, based on an overall ability for the first device 331 to provide the first impact 220, and for the second device 332 to provide the second impact 240, so that a required total impact on nitrogen oxides $NO_x$ in the exhaust stream 303 is provided by the exhaust treatment system 350.

In other words, the dosage control device 374 controls one or several of the first dosage device 371 and the second dosage device 372, and/or pumps or similar devices which supply these dosage devices 371, 372 with additive, so that a sufficient total amount of additive it supplied to the exhaust stream, through the first dosage device 371 and the second dosage device 372, in order to ensure a required total impact on the nitrogen oxides in the exhaust stream $NO_x$.

The exhaust treatment system according to the present invention has similar advantages as specified above for the method according to the present invention, for example that the activities of the first device may be controlled in order to complete the activities of the second device, and reversely, so that an overall efficient exhaust purification is provided, which takes into consideration the complete exhaust treatment system's conditions and/or characteristics.

According to one embodiment of the present invention, the exhaust treatment system may comprise a first oxidation catalyst $DOC_1$ 311, arranged upstream of the first dosage device 371, and/or the second oxidation catalyst $DOC_2$ 312, arranged downstream of the first device 331. The first oxidation catalyst $DOC_1$ 311, and/or the second oxidation catalyst $DOC_2$ 312, are in that case arranged to oxidize nitrogen compounds, carbon compounds and/or hydrocarbon compounds in the exhaust stream 303 in the exhaust treatment system 350. During the oxidation in the first oxidation catalyst $DOC_1$ 311, a part of the nitrogen monoxides NO in the exhaust stream 303 is oxidized into nitrogen dioxide $NO_2$.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are in this case used to increase the speed of the decomposition of urea into ammonia, and/or to mix the additive with the emissions, and/or to varporize the additive.

According to one embodiment of the present invention, the exhaust system 350 comprises a particulate filter 320, downstream of the first device, or downstream of the second oxidation catalyst $DOC_2$ 312, if this is comprised in the system. The particulate filter 320 is arranged to catch and oxidize soot particles. The exhaust stream 303 is here led through the filter structure of the particulate filter, where soot particles are caught in the filter structure from the exhaust stream 303 passing through, and are accumulated and oxidized in the particulate filter.

The first oxidation catalyst $DOC_1$ 311, and/or the second oxidation catalyst $DOC_2$ 312, are at least partly coated with a catalytically oxidizing coating, where such oxidizing coating may comprise at least one precious metal, for example platinum.

According to one embodiment of the present invention, the particulate filter 320 consists of a diesel particulate filter (DPF). This filter is thus used to catch, store and oxidize soot particles from the exhaust stream 303.

According to another embodiment of the present invention, the particulate filter 320 consists of a particulate filter cDPF, which is at least partly coated with a catalytically oxidizing coating, where such oxidizing coating may comprise at least one precious metal. That is to say, the particulate filter 320 may at least partly be coated with one or several precious metals, for example platinum. The particulate filter cDPF, which comprises the oxidizing coating, may provide more stable conditions for the nitrogen dioxide level $NO_2$ at the second device 332. Additionally, the use of the particulate filter cDPF, comprising the oxidizing coating, means that the value for the ratio $NO_2/NO_x$, that is to say the level of $NO_2$, may be controlled. Since the particulate filter cDPF with the oxidizing coating is used, according to one embodiment, the second oxidation catalyst $DOC_2$ 312 is not needed in the system.

According to one embodiment of the present invention, the first, and/or the second additive, comprises ammonia $NH_3$ or urea, from which ammonia may be generated/formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373, arranged to supply the first 371 and the second 372 dosage devices with additive, that is to say for example ammonia or urea.

One example of such a system 370 for supply of additive is schematically shown in FIG. 3, where the system comprises the first dosage device 371 and the second dosage device 372, which are arranged upstream of the first device 331, and upstream of the second device 332, respectively. The first and second dosage devices 371, 372, often consisting of dosage nozzles which administer additive to, and mix such additive with, the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or gaseous form. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373, so that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, so that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the first 331 and second 332 devices, and accordingly also the function for each of the first 331 and second 332 devices, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for control of supply of additive, so that a desired amount is injected in the exhaust stream 303 with the help of the first 371 and the second 372 dosage device, respectively, upstream of the first 331 and the second 332 device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The exhaust treatment system 350 may also equipped with one or several sensors, such as one or several $NO_x$, $NO_2$, and/or temperature sensors 361, 362, 363, 364, 365, arranged at the inlet to the oxidation catalyst 311, at the inlet to the first device 331, at the outlet from the first device 331, at the inlet to the oxidation catalyst 312, at the inlet to the second device 332, and/or at the outlet from the second device 332, for determination of nitrogen oxides, nitrogen dioxide and/or the temperature in the exhaust treatment system.

The control device 360 is arranged to provide control signals, and/or signals representing the measurement carried out by the one or several $NO_x$, $NO_2$ and/or the temperature sensors 361, 362, 363, 364, 365, to at least one dosage device 374. The at least one dosage control device 374 thereafter bases the control of supplying substances on such control signals, and/or measurement signals.

According to one embodiment of the present invention, the at least one dosage control device 374 is arranged to control the first supply 210 of the first additive, in such a way that the first supply 210 decreases. If the second device 332, through the second impact 240, is capable of providing a required total impact on the nitrogen oxides $NO_x$ on its own then at least one dosage control device 374 may even control the first supply 210 in such a way that an interruption of the first supply 210 is achieved. As mentioned above, such an interruption of the first supply 210 may increase the efficiency during soot oxidation in a subsequent filter, and/or may be used to regenerate the first device 331.

Similarly, the at least one dosage control device 374 is, according to one embodiment, arranged to control the second supply 230 of the second additive in such a way that the second supply 230 decreases. If the first device 331, through the first impact 220, is capable of providing a required total impact on the nitrogen oxides $NO_x$ on its own, the at least one dosage control device 374 may control the second supply 230 in such a way that an interruption of the second supply 230 is achieved as a result of the control. As mentioned above, such an interruption of the second supply 230 may be used to regenerate the second device 332.

The at least one control device 374 is drawn in the figure comprising separately marked units 378, 379. These units 378, 379 may also be logically separate, but physically implemented in the same unit, or may be both logically and physically jointly arranged/implemented. For example, these units 378, 379 may correspond to different groups of instructions, for example in the form of program code, which is fed into, and used by a processor, when the respective unit is active/used to implement the respective method steps.

The method according to the present invention may be implemented in substantially all exhaust treatment systems comprising the above described first dosage device 371, and the above described first device 331, the above described second dosage device 372, and the above described second device 332. Each of the first device 331 and the second device 332 may be arranged in a number of different ways, and have a number of different characteristics/functions, as described in the examples below.

According to different embodiments of the present invention, the first device 331 may comprise one from among the group of:

a first selective catalytic reduction catalyst $SCR_1$;

a first selective catalytic reduction catalyst $SCR_1$, followed downstream by a first slip-catalyst $SC_1$, wherein the first slip-catalyst $SC_1$ is arranged to oxidize a residue of additive, and/or to assist the first selective catalytic reduction catalyst $SCR_1$ with an additional reduction of nitrogen oxides $NO_x$ in the exhaust stream 303;

a first slip-catalyst $SC_1$, which is arranged primarily for reduction of nitrogen oxides $NO_x$, and secondarily for oxidation of additive in the exhaust stream 303;

a first slip-catalyst $SC_1$, followed downstream by a first selective catalytic reduction catalyst $SCR_1$, wherein the first slip-catalyst $SC_1$ is arranged to oxidize additive, and/or to assist the first selective catalytic reduction catalyst $SCR_1$ with a reduction of nitrogen oxides $NO_x$ in the exhaust stream 303;

a first slip-catalyst $SC_1$, followed downstream by a first selective catalytic reduction catalyst $SCR_1$, followed downstream by an additional first slip-catalyst $SC_{1b}$, wherein the first slip-catalyst $SC_1$, and/or the additional first slip-catalyst $SC_{1b}$, is arranged to oxidize additive, and/or to assist the first selective catalytic reduction catalyst $SCR_1$ with a reduction of nitrogen oxides $NO_x$ in the exhaust stream 303; and a first selective catalytic reduction catalyst $SCR_1$, combined with a purely oxidizing coating in its outlet part; and a first slip-catalyst $SC_1$, followed downstream by a first selective catalytic reduction catalyst $SCR_1$, combined with a purely oxidizing coating in its outlet part, wherein the first slip-catalyst $SC_1$ is arranged primarily for reduction of nitrogen oxides $NO_x$, and secondarily for oxidation of additive in the exhaust stream.

According to different embodiments of the present invention, the second device 332 comprises one from among the group of:
a second selective catalytic reduction catalyst $SCR_2$; and
a second selective catalytic reduction catalyst $SCR_2$, followed downstream by a second slip-catalyst $SC_2$, wherein the second slip-catalyst $SC_2$ is arranged to oxidize a residue of additive, and/or to assist the second selective catalytic reduction catalyst $SCR_2$ with an additional reduction of nitrogen oxides $NO_x$ in the exhaust stream 303.

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammonia $NH_3$, so that a redox-reaction may occur between nitrogen oxides $NO_x$ in the exhausts, and ammonia $NH_3$ available via the additive.

Slip-catalyst SC, as used in this document, means a catalyst which is arranged to oxidize additive, and/or to assist a selective catalytic reduction catalyst SCR with a reduction of nitrogen oxides $NO_x$ in said exhaust stream 303. The use of a first slip-catalyst $SC_1$ in the first device 331 facilitates a greater load, and therefore a better use of the first selective catalytic reduction catalyst $SCR_1$, and it also facilitates a reduction of the starting temperature (the "light off"-temperature) for the $NO_x$-reduction. The slip-catalyst SC may also oxidize nitrogen monoxide NO and/or hydrocarbons HC in the exhaust stream, so that heat/an exothermal reaction is created.

To provide a slip-catalyst $SC_1$ and/or the additional first slip-catalyst $SC_{1b}$, in the first device 331, which slip catalysts are multifunctional, and accordingly reduce nitrogen oxides $NO_x$ through the use of the additive, and which also oxidize the additive, entails a number of advantages for the exhaust treatment system. The first slip-catalyst $SC_1$, and/or the additional first slip-catalyst $SC_{1b}$, may here be used in symbiosis with the first reduction catalyst $SCR_1$, so that the activity of the first slip-catalyst $SC_1$, and/or the additional first slip-catalyst $SC_{1b}$, with respect to the reduction of nitrogen oxides $NO_x$, and oxidation of residues of additive, as well as the slip-catalysts' $SC_1$, $SC_{1b}$ deposit characteristics for additive, constitute a complement to the function of the first reduction catalyst $SCR_1$. The combination of these characteristics for the first device 331, comprising the first reduction catalyst $SCR_1$, the first slip-catalyst $SC_1$, and/or the additional first slip-catalyst $SC_{1b}$, mean that a higher conversion level may be obtained over the first device 331. Additionally, the use of the first slip-catalyst $SC_1$, and/or of the additional first slip-catalyst $SC_{1b}$, in the first device 331 result results in conditions making it possible to avoid a non-selective oxidation of reductant occurring in components placed downstream of the first device 331 in the exhaust treatment system, which may potentially comprise platinum metals.

Furthermore, tests have shown that the reduction of nitrogen oxides $NO_x$ with the first multifunctional slip-catalyst $SC_1$, and/or the additional first slip-catalyst $SC_{1b}$, in the first device 331 becomes surprisingly efficient. This is a result of sufficient amounts of nitrogen oxides $NO_x$ being present in the exhaust stream 303 at the first slip-catalyst $SC_1$, and/or at the additional first slip-catalyst $SC_{1b}$, in the first device 331, in order for an efficient reduction of nitrogen oxides $NO_x$ to be obtained. In other words, the relatively good availability of nitrogen oxides $NO_x$ at the first slip-catalyst $SC_1$, and/or at the additional first slip-catalyst $SC_{1b}$, may be used to achieve a very good performance, and/or a very good utilization, when a multifunctional slip-catalyst $SC_1$, and/or a multifunctional additional first slip-catalyst $SC_{1b}$, is used in the first catalyst device 331.

The first selective catalytic reduction catalyst $SCR_1$, the first slip-catalyst $SC_1$, and/or the additional first slip-catalyst $SC_{1b}$, may be used with the objective of generating heat, for example by oxidation of hydrocarbons HC in the exhaust stream, which enables regeneration of sulphur contaminated components, such as the catalyst and/or components arranged downstream of the latter. At the regeneration of the sulphur contaminated components, the amount of sulphur intercalated in the components is reduced.

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but pertains to and comprises all embodiments within the scope of the enclosed independent claims.

The invention claimed is:

1. A method in an exhaust treatment system for treatment of an exhaust stream, which results from a combustion in a combustion engine, and comprises nitrogen oxides, said method comprising:
supplying a first supply of a first additive into said exhaust stream using a first dosage device, arranged in said exhaust treatment system;
performing a first reduction of a first amount of nitrogen oxides reaching a first device, arranged downstream of said first dosage device, in order to reduce said first amount of nitrogen oxides through the use of said first additive, wherein said first reduction comprises a first reduction of said first amount of nitrogen oxides, through the use of a first selective catalytic reduction catalyst ($SCR_1$), followed by a reduction of nitrogen oxides, and/or oxidation of potential additive in said exhaust stream, through the use of a first slip-catalyst ($SC_1$);
supplying a second supply of a second additive into said exhaust stream, through the use of a second dosage device, arranged downstream of said first device;
performing a second reduction of a second amount of nitrogen oxides reaching a second device, arranged downstream of said second dosage device, in order to reduce said second amount of nitrogen oxides through the use of said first and/or second additive; and
controlling at least one of said first supply and said second supply based on an overall ability for said first device to provide said first reduction, and for said second device to provide said second reduction, so that a required total reduction of said nitrogen oxides in said exhaust stream is provided by said exhaust treatment system; and said controlling of said first supply of said first additive results in an increase of said first supply of said first additive, which is carried out in such a way that an amount of slip of additive out from said first selective catalytic reduction catalyst ($SCR_1$) occurs, which amount of slip of additive may be stored, and/or oxidized, in said first slip-catalyst ($SC_1$).

2. The method according to claim 1, wherein said controlling of said second supply comprises reducing of said second supply.

3. The method according to claim 2, wherein said reducing of said second supply comprises interruption of said second supply of said second additive, if it is determined that said first device is capable of providing said required total impact on said nitrogen oxides on its own in said exhaust stream.

4. The method according to claim 2, further comprising regenerating said second device during, and/or after, said reducing of said second supply.

5. The method according to claim 4 further comprising eliminating residues of said second additive present in said second device at said regeneration.

6. The method according to claim 1, wherein said controlling of said first supply of said first additive results in said occurring amount of slip of additive, wherein said amount of slip of additive depends on a coverage degree for additive in said first selective catalytic reduction catalyst ($SCR_1$), when said first additive exceeds a value for maximum coverage degree for additive in said first selective catalytic reduction catalyst ($SCR_1$).

7. The method according to claim 1, wherein said controlling of said second supply of said second additive comprises increasing said second supply of said second additive.

8. The method according to claim 1, wherein said required total reduction of said nitrogen oxides in said exhaust stream is determined, based on currently measured, modelled and/or predicted operating conditions for said combustion engine.

9. The method according to claim 1, wherein said required total reduction of said nitrogen oxides $NO_x$ in said exhaust stream is determined, based on at least one threshold value for emission of nitrogen oxides.

10. The method according to claim 9, wherein said at least one threshold value consists of one or more of:
    a threshold value corresponding to a legal requirement for emissions of nitrogen oxides;
    a threshold value determined by authorities, representing a permitted emission of nitrogen oxides; and
    a threshold value representing a maximum desired emission of nitrogen oxides.

11. The method according to claim 1, wherein said ability for said first device to provide said first reduction depends on one or several of:
    catalytic characteristics for said first device;
    a catalyst type for said first device;
    a temperature interval within which said first device is active;
    a coverage degree of additive for said first device; and
    a temperature at said first device.

12. The method according to claim 1, wherein said ability for said second device to provide said second reduction depends on one or several of:
    catalytic characteristics for said second device;
    a catalyst type for said second device;
    a temperature interval within which said second device is active;
    a coverage degree of additive for said second device; and
    a temperature at said second device.

13. The method according to claim 1, wherein said first amount of nitrogen oxides ($NO_{x\_1}$) corresponds to a first ratio ($NO_{2\_1}/NO_{x\_1}$), between a first amount of nitrogen dioxide ($NO_{2\_1}$) and a first amount of nitrogen oxides ($NO_{x\_1}$), reaching said first device; wherein said first supply of said first additive is based on a determined value ($NO_{2\_1}/NO_{x\_1})_{det}$ for said first ratio, so that a fast reduction may be used in said first device.

14. The method according to claim 13, wherein said determined value for said first ($NO_{2\_1}/NO_{x\_1}$) consists of one from among the group:
    a measured value;
    a modelled value; and
    a predicted value.

15. An exhaust treatment system, arranged for treatment of an exhaust stream, which results from a combustion in a combustion engine and comprises nitrogen oxides $NO_x$, said system comprising:
    a first dosage device, arranged in said exhaust treatment system to provide a first supply of a first additive into said exhaust stream;
    a first device, arranged downstream of said first dosage device to provide a first reduction of a first amount of nitrogen oxides reaching said first device through the use of said first additive, wherein said first device includes a first selective catalytic reduction catalyst ($SCR_1$), followed downstream by a first slip-catalyst ($SC_1$), wherein said first slip-catalyst $SC_1$ is arranged to oxidize a residue of additive, and/or to assist the first selective catalytic reduction catalyst ($SCR_1$) with an additional reduction of nitrogen oxides in said exhaust stream;
    a second dosage device, arranged downstream of said first device, to provide a second supply of a second additive into said exhaust stream;
    a second device, arranged downstream of said second dosage device, to provide a second reduction of a second amount of nitrogen oxides reaching said second device through the use of said first and/or second additive; and
    at least one dosage control device, arranged to control at least one of said first supply and said second supply, based on a total ability for said first device to provide said first reduction, and for said second device to provide said second reduction, so that a required total reduction on said nitrogen oxides in said exhaust stream is provided by said exhaust treatment system, wherein said at least one dosage control device is arranged to control said first supply of said first additive such that said control results in an increase of said first supply of said first additive, whereby an amount of slip of additive out from said first selective catalytic reduction catalyst ($SCR_1$) occurs, which amount of slip of additive may be stored, and/or oxidized, in said first slip-catalyst ($SC_1$).

16. The exhaust treatment system according to claim 15, wherein said at least one dosage control device is arranged to control said second supply of said second additive in such a way that said second supply of said second additive is reduced.

17. The exhaust treatment system according to claim 16, wherein said at least one dosage control device is arranged to control said second supply in such a way that an interruption of said second supply of said second additive occurs, if it is determined that said first device is capable of providing said required total reduction of said nitrogen oxides on its own in said exhaust stream.

18. The exhaust treatment system according to claim 15, wherein said first catalyst device comprises:
a first slip-catalyst ($SC_1$), followed downstream by a first selective catalytic reduction catalyst ($SCR_1$), followed downstream by an additional first slip-catalyst ($SC_{1b}$), wherein said first slip-catalyst ($SC_1$), and/or said additional first slip-catalyst ($SC_{1b}$), are arranged to oxidize additive, and/or to assist said first selective catalytic reduction catalyst ($SCR_1$) with a reduction of nitrogen oxides in said exhaust stream.

19. The exhaust treatment system according to claim 15, wherein said second device consists of one from among the group of:
a second selective catalytic reduction catalyst ($SCR_2$); and
a second selective catalytic reduction catalyst ($SCR_2$), followed downstream by a second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides in said exhaust stream.

20. A computer program product for treatment of an exhaust stream, which results from a combustion in a combustion engine, said computer program product comprising computer program code stored on a non-transitory computer readable medium, said computer program code comprising computer instructions to cause one or more computer processors to perform: a first supply of a first additive into said exhaust stream, through the use of a first dosage device, arranged in said exhaust treatment system;

supplying a first supply of a first additive into said exhaust stream using a first dosage device, arranged in said exhaust treatment system;

performing a first reduction of a first amount of nitrogen oxides reaching a first device, arranged downstream of said first dosage device, in order to reduce said first amount of nitrogen oxides through the use of said first additive, wherein said first reduction comprises a first reduction of said first amount of nitrogen oxides, through the use of a first selective catalytic reduction catalyst ($SCR_1$), followed by a reduction of nitrogen oxides and/or oxidation of potential additive in said exhaust stream, through the use of a first slip-catalyst ($SC_1$);

supplying a second supply of a second additive into said exhaust stream, through the use of a second dosage device, arranged downstream of said first device;

performing a second reduction of a second amount of nitrogen oxides reaching a second device, arranged downstream of said second dosage device, in order to reduce said second amount of nitrogen oxides through the use of said first and/or second additive; and controlling at least one of said first supply and said second supply based on an overall ability for said first device to provide said first reduction, and for said second device to provide said second reduction, so that a required total reduction of said nitrogen oxides in said exhaust stream is provided by said exhaust treatment system; and said controlling of said first supply of said first additive results in an increase of said first supply of said first additive, which is carried out in such a way that an amount of slip of additive out from said first selective catalytic reduction catalyst ($SCR_1$) occurs, which amount of slip of additive may be stored, and/or oxidized, in said first slip-catalyst ($SC_1$).

* * * * *